United States Patent Office 3,524,105
Patented Aug. 11, 1970

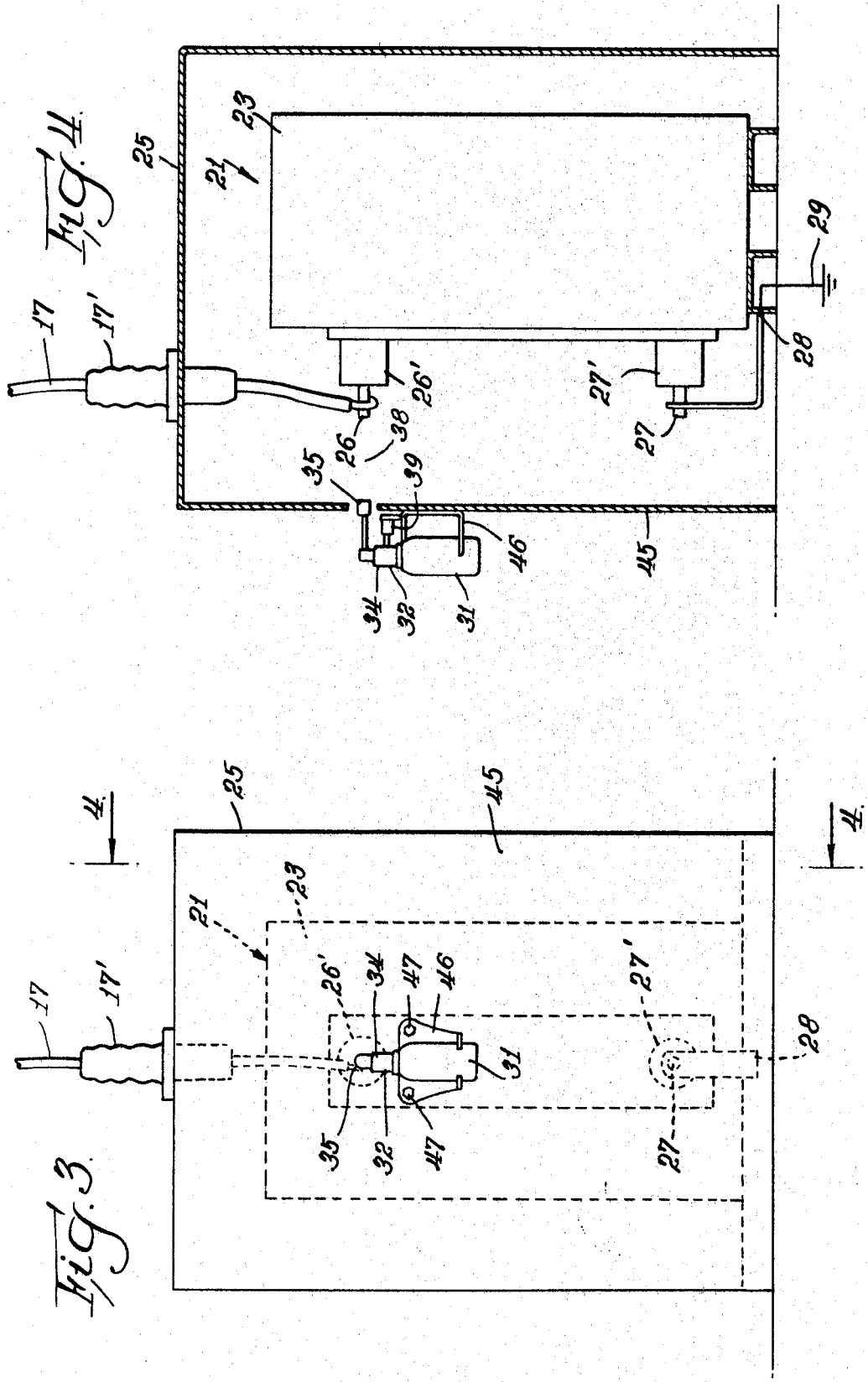

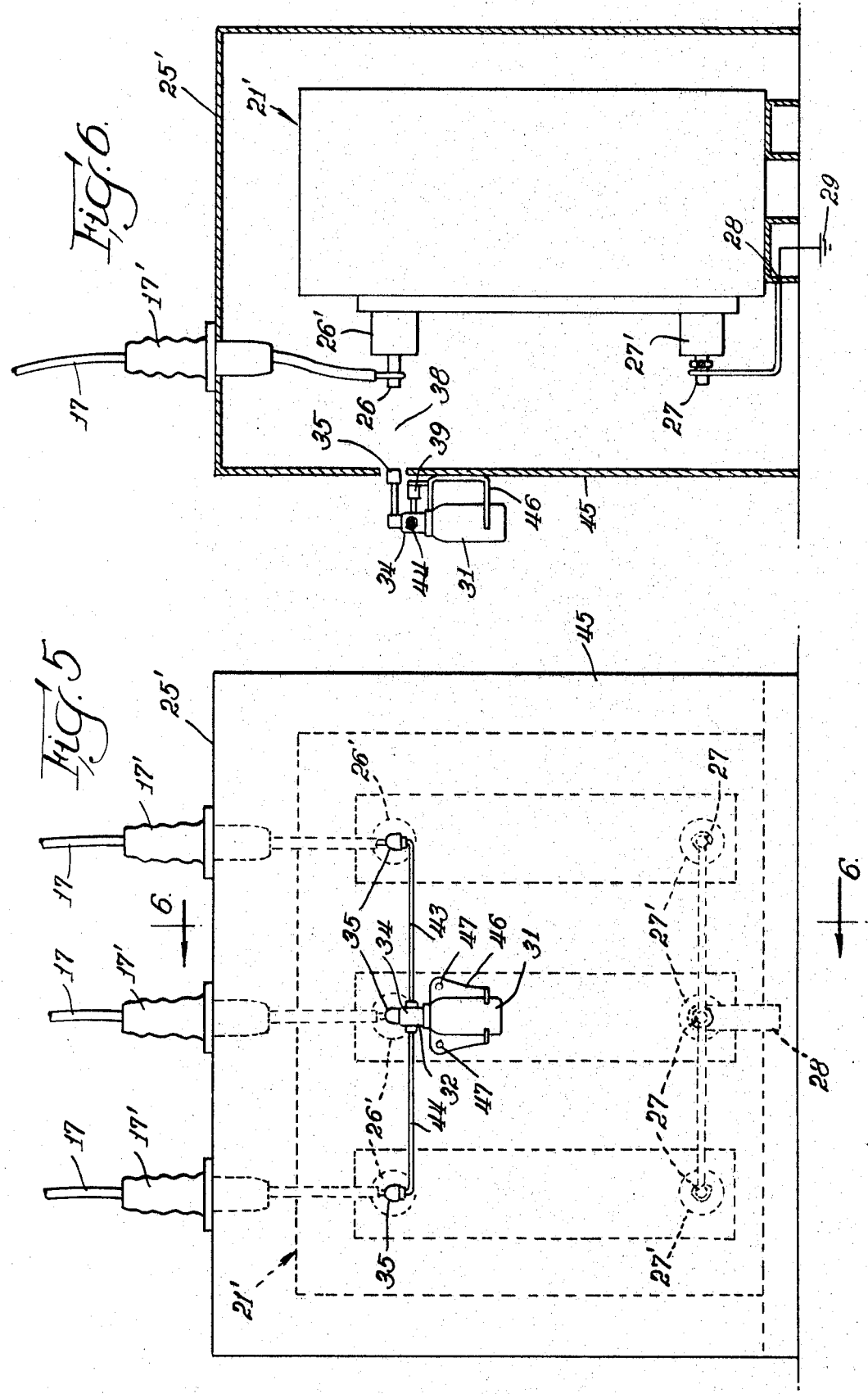

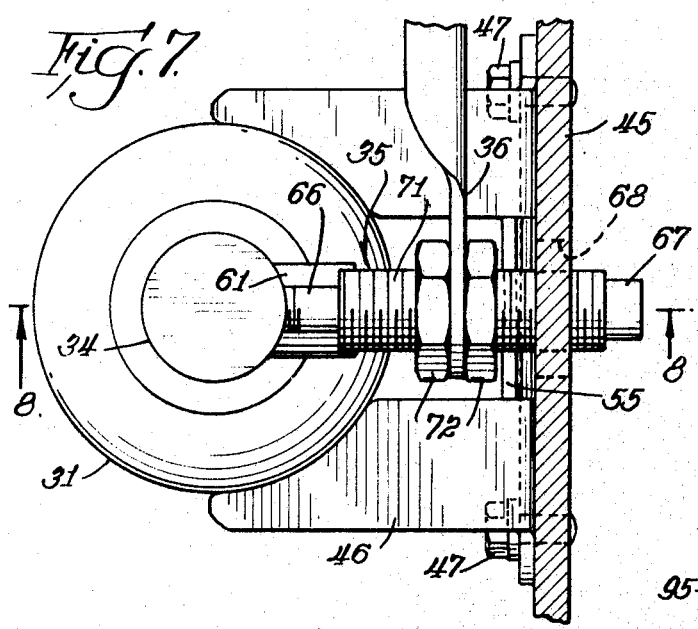
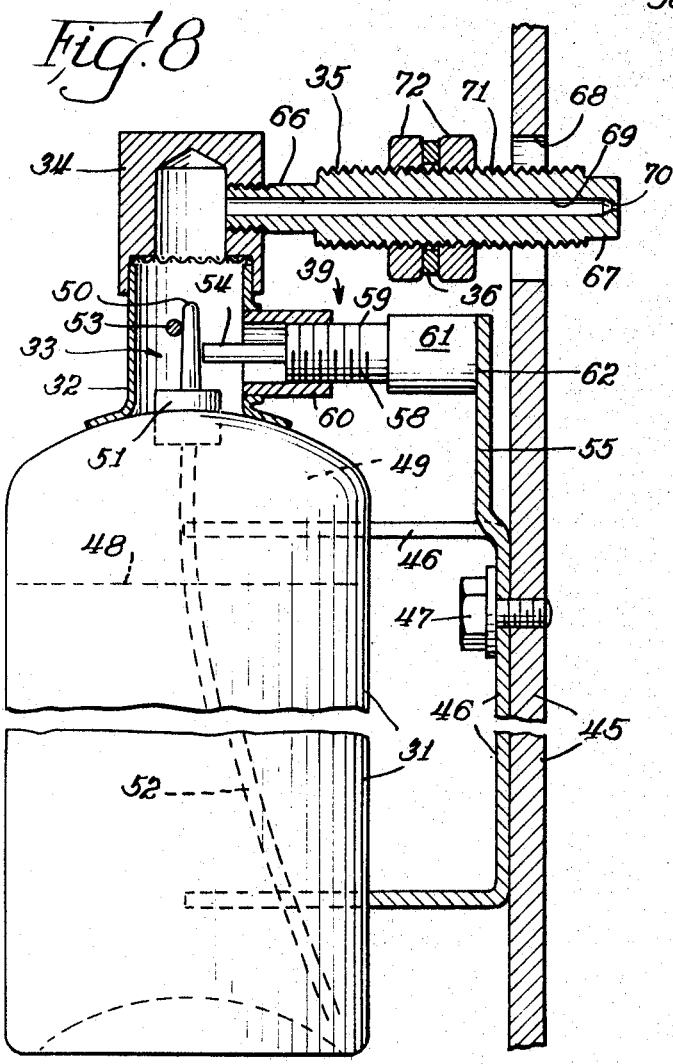
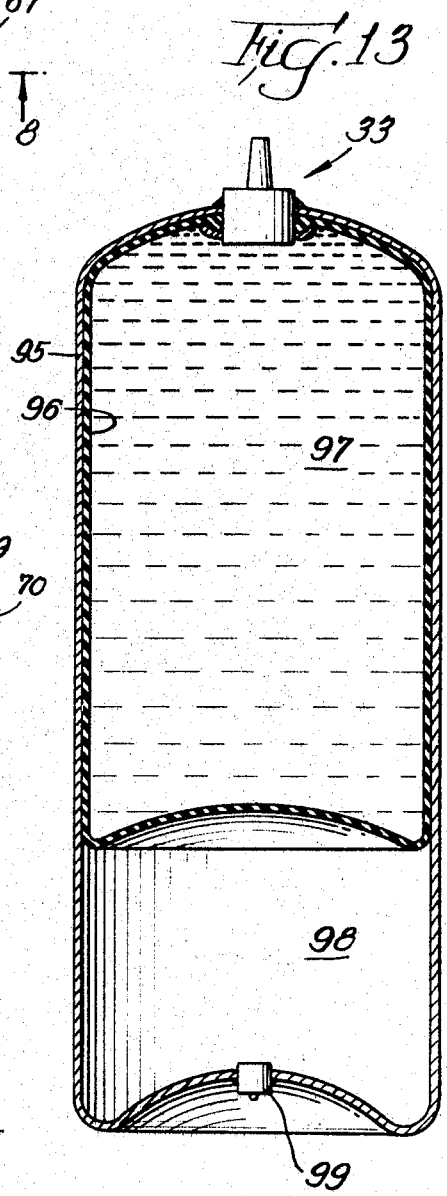

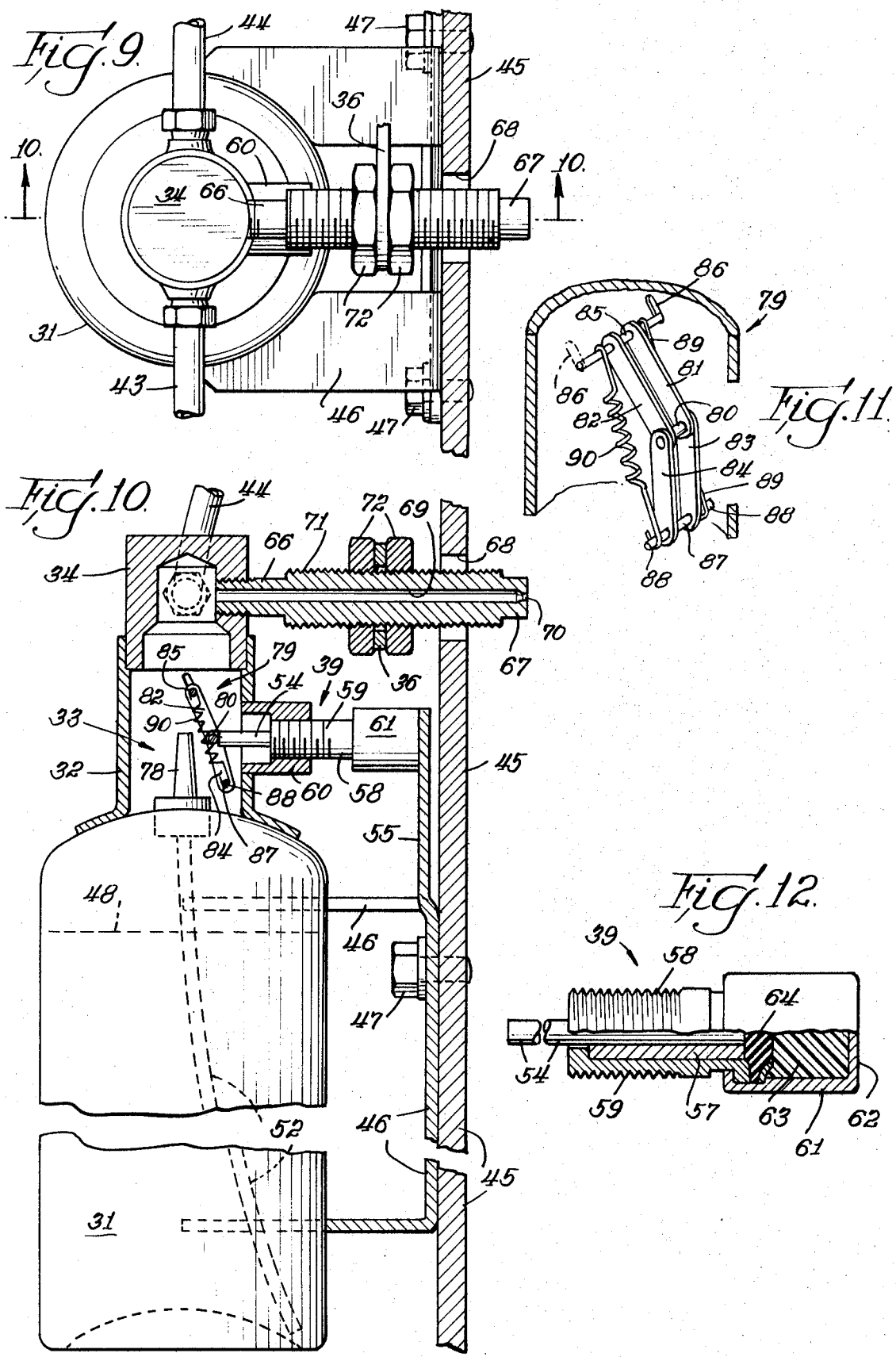

3,524,105
TEMPERATURE RESPONSIVE FAULT MAKING SYSTEM FOR SINGLE PHASE OR POLYPHASE TRANSFORMERS
Robert H. Harner, Park Ridge, and William R. Goldbach, Des Plaines, Ill., assignors to S & C Electric Company, Chicago, Ill., a corporation of Delaware
Filed Oct. 28, 1968, Ser. No. 771,176
Int. Cl. H02h 5/04, 7/04
U.S. Cl. 317—15          18 Claims

ABSTRACT OF THE DISCLOSURE

An arc gap between a high voltage terminal of a single phase protected transformer and ground is bridged by a conductive fluid causing the protective interrupting device to operate, when the transformer temperature rises to a predetermined value due to a fault in the transformer or an excessive overload. Certain types of transformer faults are accompanied by insufficient current flow to operate a protective device. For a polyphase protected transformer an arc gap for each phase is bridged by the conductive fluid to cause the respective interrupting device to operate.

---

Figure 1:
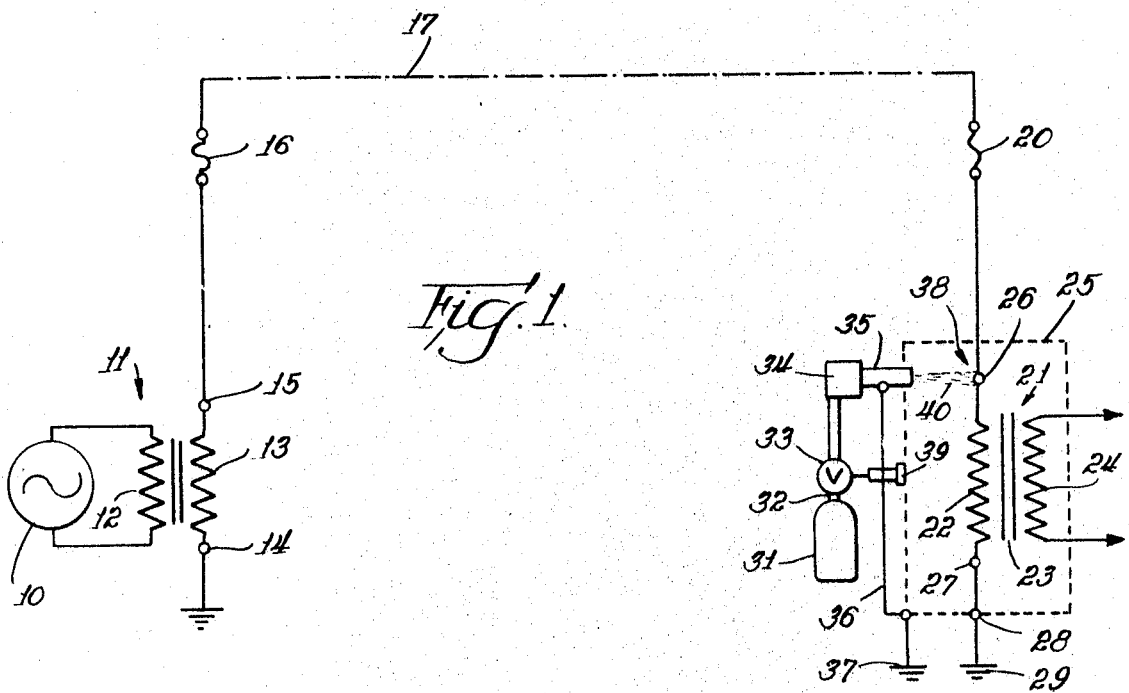

Electric power distribution in commercial and residential buildings is becoming increasingly common at voltages of the order of 12 kv. Dry type transformers, either single phase or polyphase, enclosed in metallic cases are customarily used for these installations. Overload and short circuit protection can be provided, for example, by a fuse in series with the high voltage or primary transformer winding. Certain types of internal faults in the transformer do not result in current flow through the fuse adequate to blow it. An example of such a fault is a short circuited turn in one of the transformer windings. Although the increase in current flow due to such a fault is slight and inadequate to blow the fuse, a great deal of heat may be generated resulting in severe overheating of the transformer core and windings, and of the enclosing metallic case. The overheating may be so great as to ignite combustible material in the transformer compartment or vault and thereby possibly endanger the entire building.

Among the objects of this invention are: To provide for deenergized a protected transformer or other electrically energized device when the temperature of its case reaches a predetermined value due to an internal fault insufficient to cause a protective device to operate; to cause a flow of current through a device protecting the transformer in response to such temperature rise, sufficient to cause the same to operate and open the circuit; to provide an arc gap between the high voltage terminal of a winding of the transformer or other protected device and a grounded terminal and to bridge this arc gap in response to temperature rise of the transformer to cause current to flow through the protective device sufficient to operate it and thereby deenergize the transformer; to bridge the arc gap by a conductive fluid; for a polyphase transformer to provide such an arc gap for each phase and to bridge all of the arc gaps simultaneously to cause the protective devices for the respective phases to operate; to store the conductive fluid in a container under pressure and to direct the flow thereof to the arc gap by a nozzle on opening of a valve in response to operation of a heat sensor in contact with the metallic case; to employ the nozzle as the grounded terminal of the arc gap; to form the container of corrosion resisting material when the conductive fluid is corrosive in nature; to mount a sensor on a metallic case for the transformer or like device and to employ in it a material that has substantial abrupt expansion on being subjected to a predetermined temperature; and to employ different valve constructions under the control of the heat sensor for releasing the conductive fluid to bridge the arc gap or gaps.

According to this invention a fuse or other interrupting device protected high voltage winding of an electric power distribution transformer in a metallic case has an arc gap between its high voltage terminal and ground that is arranged to be bridged by a conductive fluid which is released by a heat sensor when the temperature of the transformer and the case reaches a predetermined value. Current flow through the fuse then is sufficient to cause it to blow and deenergize the transformer. The conductive fluid is stored under pressure in a corrosion resisting container that is mounted on the case. The conductive fluid is directed from the container through a nozzle to the arc gap on opening of a valve by the heat sensor. The nozzle is metallic and forms the grounded terminal of the arc gap. For a fuse protected polyphase transformer an arc gap is provided for each phase. The conductive fluid is caused to flow simultaneously from a single container to bridge all of the arc gaps and blow all of the fuses. The conductive fluid can also be sprayed over an insulating bushing carrying the high voltage terminal to cause a flashover. One form of the container has a dip tube extending from a valve at the top to near the bottom with a filling of gas under pressure at the top. Another form of the container employs a bladder filled with the conductive fluid. The bladder is surrounded by a filling of gas under pressure. The release valve, which is intended for only a single operation, employs a frangible member or a tilt valve under the control of the heat sensor.

Figure 2:
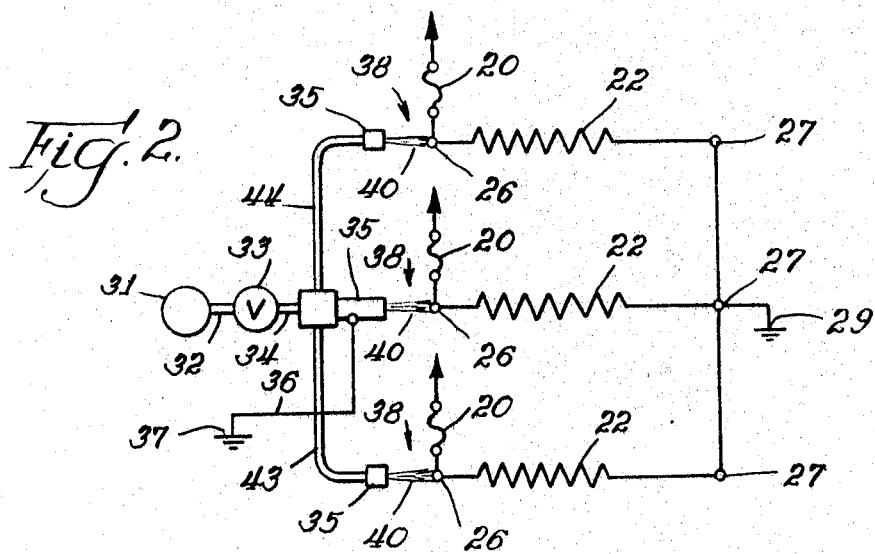
Figure 14:
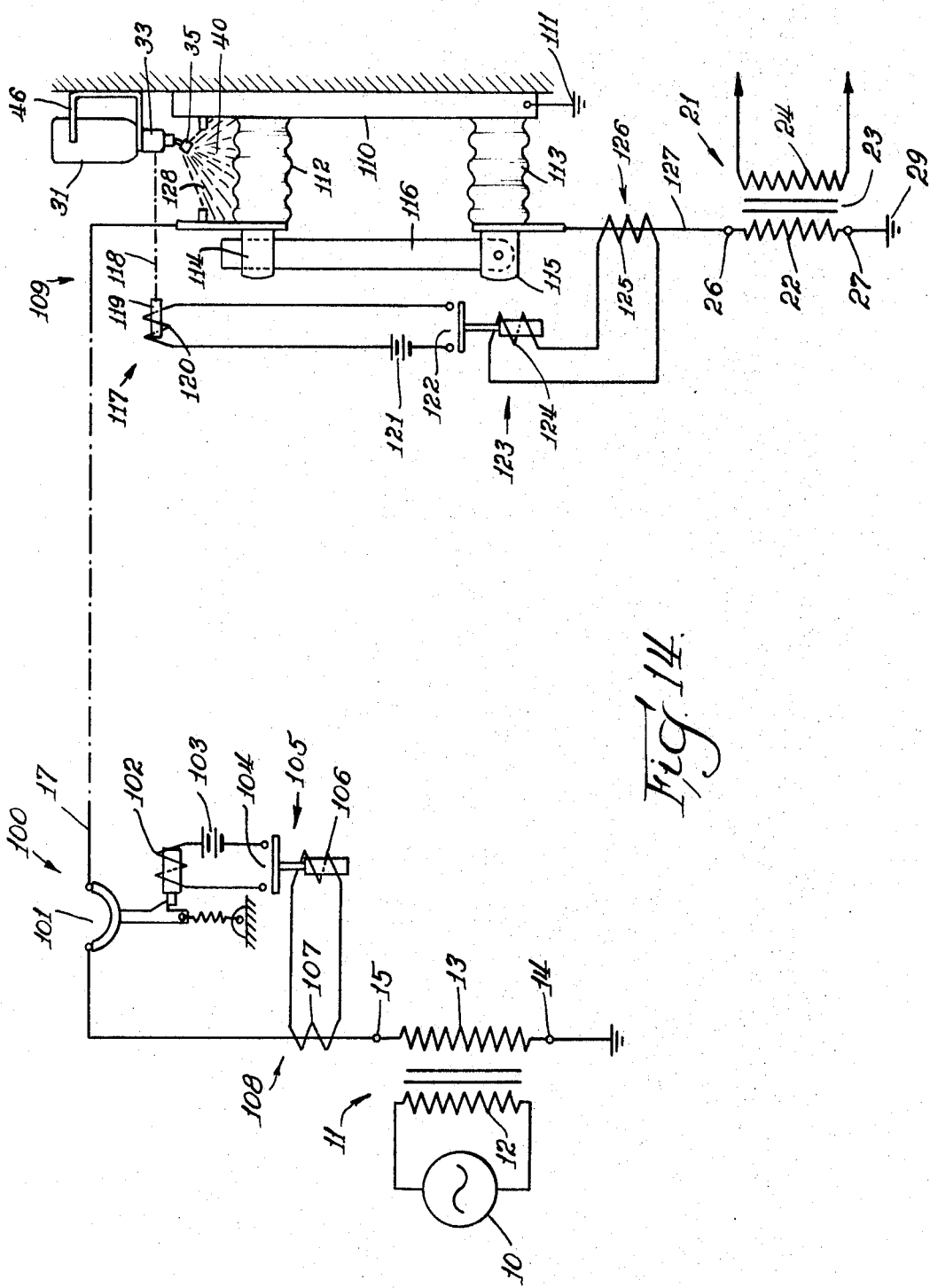

In the drawings: FIG. 1 shows diagrammatically a portion of an electric power distribution system in which this invention is embodied. FIG. 2 shows diagrammatically the application of this invention to the windings of a polyphase transformer. FIG. 3 is a view in front elevation of a case containing a single phase transformer embodying this invention. FIG. 4 is a sectional view taken generally along the line 4—4 of FIG. 3. FIG. 5 is a view, in front elevation, of a polyphase transformer in a metallic case in which this invention is embodied. FIG. 6 is a vertical sectional view taken generally along the line 6—6 of FIG. 5. FIG. 7 is a top plan view, at an enlarged scale, of the conductive fluid container and the nozzle, the side wall of the case being shown in section. FIG. 8 is a vertical sectional view taken generally along the line 8—8 of FIG. 7. FIG. 9 is a view, similar to FIG. 7, and illustrates the application of this invention for polyphase operation. FIG. 10 is a vertical sectional view taken generally along the line 10—10 of FIG. 9. FIG. 11 is a perspective view of a snap acting operating mechanism that can be employed between the heat sensor and the valve that releases the conductive fluid. FIG. 12 is a view, partly in side elevation and partly in section, of the heat sensor. FIG. 13 (sheet 4) shows a modified form of the container which is arranged to function regardless of its physical position. FIG. 14 shows diagrammatically another system modification.

Referring now particularly to FIG. 1 of the drawings, the reference character 10 designates an alternating current generator that is located in an electric power generating station and is arranged to energize a step up power transformer indicated generally at 11. The transformer 11 includes a primary winding 12 that is connected to the generator 10 and a secondary winding 13 that has a relatively high voltage output in accordance with conventional practice. The secondary winding 13 has a grounded terminal 14 and a high voltage terminal 15 that is connected by a fuse 16, or other circuit interrupting device, to a high voltage conductor which forms a part of electric power distribution system. It will be understood that ordinarily the generator 10 is a three phase generator and that the transformer 11 is either a three phase transformer or comprises three single phase transformers. Also, as is conventional, three high voltage conductors 17 are employed.

While conventional practice employs one or more step-down transformers from the high voltage conductor 17, for illustrative purposes it is shown in FIG. 1 as being connected through a fuse 20 or similar protective device to a step down power distribution transformer that is indicated generally at 21. The transformer 21 includes a primary winding 22, a magnetic core 23 and a secondary winding 24 that is connected to energize low voltage distribution circuits such as circuits operating at voltages of the order of 115 to 230 volts.

The transformer 21, which is of the dry type, is positioned in a metallic case 24 that is indicated by the broken line outline. The primary winding 22 has a high voltage terminal 26 which is connected for energization to the high voltage conductor 17 through the fuse 20 or like device. Also it has low voltage terminal 27 that is connected at 28 to the metallic case 25 and to ground at 29 to which the transformer core 23 also is connected.

It is conventional practice to provide the fuse 20 or other circuit interrupting device to have such a characteristic that the minimum current flow through it required to operate it is on the order of three times full load capacity of the primary winding 22. For example, if the normal full load current carrying capacity of the primary winding 22 is 10 amperes, then the fuse 20 is selected to have such a time current characteristic that it will blow on flow therethrough of 30 amperes. Thus it requires a minimum flow of 30 amperes through the fuse 20 to cause it to blow and deenergize the transformer 21.

As pointed out above, there is the possibility that the transformer 21 may be subject to an internal fault. For example, one of the turns of the primary winding 22 may become short circuited due to failure of the insulation between them. On the occurrence of a short circuited turn a current flow takes place in the short circuited turn which is considerably in excess of the current flow therethrough under normal operating conditions. This current flow is caused by the transformer action between the short circuited turn and the remaining turns of the winding 22. As a result of this flow of current a substantial amount of heat is generated in the windings 22 and 24 and in the transformer case 25, particularly, which may develop into the dangerous conditions above noted. This invention is particularly addressed to a solution of the problem just outlined in which on the occurrence of an internal fault the current flow is not sufficient to cause the fuse 20 to blow and deenergize the transformer 21.

In accordance with this invention a container 31 is provided for containing a conductive fluid under pressure. When the conductive fluid is corrosive in nature, the container 31 is formed of corrosion resisting material such as copper, aluminum plastic and the like. A conduit 32 connects the container 31 to a valve 33 which, when opened, permits the conductive fluid to flow into a manifold 34 from which a nozzle 35 extends. Preferably, the nozzle 35 is formed of good conducting metal, such as copper or copper alloy. It extends into the metallic case 25 and is connected by a ground bus conductor 36 to ground indicated at 37. The nozzle 35 is so located that an arc gap 38 is formed between its discharge end and the high voltage terminal 26. For controlling the opening of the valve 33 a heat sensor 39 is mounted on the metallic case 25 and is responsive to the temperature thereof. When that temperature rises to a predetermined value, the heat sensor 39 opens the valve 33 and permits the conductive fluid under pressure from the container 31 to flow through the nozzle 35 and bridge the arc gap 38 as indicated at 40. This in effect grounds the high voltage terminal 26 and causes sufficient current to flow through the fuse 20 as the result of which it blows and opens the circuit to the transformer 21. Ordinarily, when sufficient heat is developed to cause the heat sensor 39 to open the valve 33, the transformer 21 has been damaged to such an extent that it must be replaced. Also the fuse 20 must be replaced. However, by causing the fuse 20 to blow in the manner described, the damage is limited to the transformer 21 and to the requirement that the fuse 20 be replaced.

FIG. 2 shows diagrammatically the application of the present invention to a polyphase transformer. Here only the three primary windings 22 are shown. The low voltage terminals 27 are commonly connected to ground 29. The high voltage terminals 26 have nozzles 35 individual thereto to form therewith the arc gaps 38. Conduits 43 and 44 interconnect the manifold 34 with the nozzles 35. The arrangement is such that, on opening of the valve 34 as the result of an internal fault associated with any one of the primary windings 22, all of the arc gaps 38 are bridged as indicated at 40 and the fuses 20 individual to the primary windings 22 are blown substantially simultaneously to deenergize completely the polyphase transformer.

FIGS. 3 and 4 show in more detail the arrangement illustrated diagrammatically in FIG. 1. Here it will be observed that the high voltage conductor 17, after being connected through the fuse 20, which is suitably located, extends through an insulating bushing 17' and is connected to the high voltage terminal 26. A high voltage bushing 26' mounted on the grounded transformer core 23 supports the high voltage terminal 26 on the transformer 21 which provides the necessary connection to the primary winding 22. The low voltage terminal 27 extends through a low voltage insulating bushing 27' from the low voltage end of the primary winding 22 and is connected at 28 to the case 25 and to ground 29. The conducting fluid from the nozzle 35 is also directed to flow over the insulating bushing 26' and thereby completes a conducting path over it to the grounded transformer core 23.

In a similar manner FIGS. 5 and 6 show the arrangement for a polyphase transformer which is indicated, generally, at 21'. It is enclosed in a larger metallic case 25'. The conduits 43 and 44 extend from opposite sides of the manifold 34 to direct the flow of the conductive fluid to the outside high voltage terminals 26.

FIGS. 7 and 8 illustrate in more detail the manner in which the container 31 is employed to cause the flow of conductive fluid under pressures through the nozzle 35. Here a wall of the metallic case 25 or 25' is indicated at 45. To the outside of the wall 45 a bracket 46 is secured by bolts 47. The bracket 46 is arranged to support the container 31 in a vertical position in which the level of the fluid is indicated at 48. The conductive material may be a liquid which will provide the necessary conducting characteristics to permit sufficient current flow to cause the fuse 20 to blow. Examples of satisfactory conducting fluids are sodium chloride, lithium chloride and tin chloride. A 15% sodium chloride solution has been used with good success. However, lower or higher concentrations also can be employed.

The fluid within the container 31 in the liquid state is maintained under pressure by a filling of gas that is indicated at 49. For example, various Freon compounds can be employed at pressures of the order of 5 pounds gauge. The gas filling is selected so as to be compatible with the conductive fluid and also with the material of which the container 31 is constructed. As pointed out, where the conductive fluid is corrosive, the container 31 can be formed of aluminum. Preferably it has a hard coating on its inner surface formed by anodizing. Also the container 30, when formed of aluminum, can have a plastic coating on its inner surface to resist the action of the corrosive conductive fluid.

The valve 33 must have absolute reliability, be instantaneous in operation and provide a positive release for the conductive fluid upon actuation by the heat sensor 39. Also it is required to have a zero or extremely low leak rate. In the embodiment shown in FIG. 8 the valve 33 comprises a glass tube 50 that extends from a fitting 51 which is sealed to the upper end of the container 31. A dip tube 52 connects a fitting 51 to the lower portion of the container 31. The glass tube 50 provides the necessary seal which is broken against a transverse pin 53, which extends through the conduit 32, by a valve operator 54 in the form of a rod which is moved by the heat sensor 39 when it is subjected to a predetermined temperature. It will be noted that the glass tube 30 is frangible in nature than that, on extension of the valve operator 54, it is held by the transverse pin 53 and is readily ruptured from the fitting 51 to allow the conductive fluid in the container 31 to be discharged through the dip tube 52, conduit 32, manifold 34, and nozzle 35 into the arc gap 38.

The heat sensor 39 is mounted on the upper offset end 55 of the bracket 46 which is held in good heat conducting relation to the outside surface of the front side wall 45 of the metallic case 25. Since the bracket 46 is formed of good heat conducting metal, it readily conducts the heat from the wall 45 to the heat sensor 39.

FIG. 12 shows the details of construction of the heat sensor 39. The valve operator 54, in the form of a rod, is slidably mounted in a guide sleeve 57 which is enclosed by a metallic tube 58 having an external thread 59. The purpose of the thread 59 is to mount the sensor 39 in the internally threaded lateral extension 60 from the conduit 32. The metallic tube 58 extends from a cylindrical metallic housing 61 having an end wall 62 that is suitably secured to the offset upper end 55 of the bracket 46. Within the cylindrical metallic housing 61 there is a charge of plastic material, such as paraffin wax having a filling of copper dust, which has the characteristic of being stable until it reaches a predetermined temperature at which it begins to expand rapidly due to an abrupt change in its coefficient of expansion. Expansion of the charge 63 is transmitted through a flexible diaphragm 64 to the juxtaposed end of the valve operator 54 which is moved outwardly to actuate the valve 33 in the manner described. By selection of the proper material for the charge 63 the heat sensor 39 can be arranged to open the valve 33 over a range of 130° F. to 250° F. and to exert a force varying from 10 lbs. to 100 lbs., depending upon the quantity of the material making up the charge 63 and the diameter of rod 54.

Referring again to FIG. 8, it will be observed that the nozzle 35 has a reduced threaded end 66 which extends into the manifold 34. The other end 67 of the nozzle 35 provides the grounded terminal for the arc gap 38. The nozzle 35 may be formed of a corrosion resisting material such as copper or copper alloy. It extends through an opening 68 in the wall 45 of the metallic case 25 and has a relatively large diameter bore 69 extending substantially entirely therethrough. At the discharge end of the nozzle 35 a relatively small diameter nozzle opening 70 communicates with the bore 69 and provides a relatively large spray angle so that the alignment between the discharge end 67 of the nozzle 35 and the high voltage terminal 26 is not particularly critical. Since the nozzle 35 forms one terminal of the arc gap 38, provision is made for connecting the ground bus conductor 36 thereto. For this purpose an external thread 71 is provided on the nozzle 35 for receiving terminal clamp nuts 72 for clamping therebetween a terminal attached to the ground bus conductor 36 or clamping the same therebetween if it is formed of a conducting bar.

FIGS. 9 and 10 show a construction that is generally similar to that shown in FIGS. 7 and 8. Here the manifold 34 is illustrated as being connected to the conduits 43 and 44 for use in connection with a three-phase installation.

The valve 33 in FIG. 10 is of the tilt type commonly used on aerosol containers and can be used as an alternate to the valve 33 with the glass tube 50 previously described. It includes a fitting 77 sealed to the upper end of the container 31 from which a rod 78 extends upwardly. The heat sensor 39 is arranged to tilt the rod 78 on extension of the valve operator rod 54 for the purpose of releasing the conductive fluid from the container 31 to flow in the manner previously described and through the conduits 43 and 44 for the purpose outlined above. The valve operator rod 54 can contact directly the rod 78, as illustrated in FIG. 8, or a snap acting operating mechanism, indicated generally at 79, can be employed.

The construction of the snap acting operating mechanism 79 is shown in more detail in FIG. 11. It includes a center bar 80 that is arranged to be engaged by the distal end of the valve operator rod 54. One end of each of a pair of upper links 81 and 82 is pivoted to the center bar 80 while the upper end of each of a pair of lower links 83 and 84 likewise is pivoted to the center bar 80. An upper bar 85 interconnects the upper ends of the upper links 81 and 82 and it is arranged to slide in a slot 86 in the manifold 34. The lower bar 87 is mounted to operate about a fixed pivot 88. Tension springs 89 and 90 interconnect the pins of the upper and lower bars 85 and 87 to provide an overcenter toggle operating mechanism. Once the valve operator rod 54 has extended to such a position that the center bar 80 moves past the center position between the upper and lower bars 85 and 87, the springs 89 and 90 then carry the center bar 80 forward to engage the rod 78 and open the valve 33 by a tilting action.

FIG. 13 shows a container 95 the position of which does not affect the discharge of the conductive fluid. Within the container 95 there is positioned a bladder 96 of suitable corrosion resisting flexible material such as neoprene, polyethylene or the like. A conductive fluid 97 of the kind and character above referred to fills the bladder 96. A gas filling 98 within the container 95 and around the bladder 96 acts to discharge the conductive fluid 97 on opening of the valve 33 in the manner previously described. A filling valve 99 is located at the end of the container 95 opposite the discharge valve 33 to permit the container 95 to receive the gas filling 98 to provide the necessary pressure against the bladder 96.

While the nozzle 35 has been described as being formed of conductive material and itself forming one of the terminals for the arc gap 38, it will be understood that it can be formed of insulating material with a conductive tip to which the ground bus conductor 35 is connected. Alternatively, the nozzle 35 can be formed entirely of insulating material and a ground terminal can be provided to cooperate with the high voltage terminal 26 and form the arc gap 38 which is bridged by the conductive fluid in the manner described.

It will be understood that the arrangement of the nozzle 35, container 31 and the mechanism associated therewith shown herein is shown for illustrative purposes and that other arrangements can be used. Depending upon the construction of the transformer 21 and metallic case 25 therefor, other locations for the nozzle 35 and container 34 can be selected. Instead of bridging the gap between the terminal 26 and the grounded nozzle 35, the conducting fluid can be sprayed over the insulator bushing 26' for the single phase transformer 21 or commonly over all of the insulator bushings 26' for the polyphase transformer 21' to ground the respective terminal 26 directly to the grounded transformer core 23. A single nozzle 35 and container 31 can be employed for the polyphase installation or a nozzle 35 and container 31, individual to each phase can be provided.

FIG. 14 shows a further modifiuation of the system illustrated in FIG. 1. In FIG. 14 a circuit breaker, indicated generally at 100, is employed having separable contacts 101 connected in the high voltage conductor 17 for completing the energization thereof from the secondary winding 13 of the step up power transformer 11. Associated with the circuit breaker 100 is a trip coil 102 that is arranged to be energized from a battery 103 on closure of contacts 104 of a relay that is indicated at 105. An operating winding 106 is arranged to effect the closure of contacts 104 on flow of predetermined current in the conductor 17. For this purpose the operating winding 106 is connected to a secondary winding 107 of a current transformer that is indicated, generally, at 108 the primary winding of which is the conductor 17. The arrangement is such that, on flow of predetermined current in the conductor 17, the operating winding 106 of the relay 105 is energized sufficiently to close contacts 104 and effect the energization of the trip coil 102 with the result that the contacts 101 of the circuit breaker 100 are opened to deenergize the high voltage conductor 17.

In this embodiment of the invention the primary winding 22 of the step down distribution transformer 21 is energized from the remote end of conductor 17 through a disconnecting switch that is indicated, generally, at 109. The disconnecting switch 109 includes a metallic base 110 that is grounded as indicated at 111. Insulators 112 and 113 are mounted near the ends of the metallic base 110 and they support switch contacts 114 and 115 that are arranged to be bridged by a switch blade 116.

Under the conditions where one or more turns of the primary winding 22 of the transformer 21 may become short circuited or where a fault occurs across secondary winding 24, there will be only a slight increase in the current flow through the conductor 17 over that which normally takes place when the transformer 21 is operating under normal load conditions. Such an overcurrent cannot ordinarily be detected by the current transformer 108 and the associated relay 105. Accordingly, provision is made in accordance with this invention for employing the spray 40 of conductive fluid to provide a ground on the conductor 17 in order to cause sufficient current to flow therethrough to effect operation of the relay 105. For this purpose the container 31, previously described and filled with a conductive fluid under pressure, is mounted by the bracket 46 in such a position that the fluid 40 from the spray nozzle 35 is directed to flow over the insulator 112 or over a rod gap arrangement 128 and establish a conductive path between the switch contact 114 or the rod gap 128 and the metallic base 110 which is grounded at 111.

For releasing the conductive fluid an electromagnetic operator, indicated generally at 117, is employed. It is connected as indicated by broken line 118 to operate the valve 33, FIG. 8, in the same manner that the heat sensor 39 is arranged to operate it. This is accomplished through the provision of an armature 119 that is arranged to be moved by an operating winding 120 to effect the opening of the valve 33. The operating winding 120 is energized from a battery 121 on closure of contacts 122 which form a part of a relay that is indicated, generally, at 123 and has an operating winding 124 which is connected for energization to a secondary winding 125 of a current transformer that is indicated, generally, at 126 with conductor 127 interconnecting the switch contact 115 and high voltage terminal 26 forming the primary winding.

On the occurrence of a fault which is insufficient to effect operation of the relay 105 for opening the circuit breaker 100, sufficient current is induced in the secondary winding 125 to energize operating winding 124 and close contacts 122. Operating winding 120 then is energized and the valve 33 is opened to release the conductive fluid which, as indicated at 40, sprays over the insulator 112 or the rod gap 128 and forms a conductive path from the conductor 17 to the grounded metallic base 110. Sufficient current then flows through the conductor 17 to effect the energization of the relay 105 and the circuit breaker 100 is tripped to open the energizing circuit to the transformer 21.

While the present invention has been disclosed in conjunction with the step down power distribution transformer 21, it will be understood that other electrically energizeable devices can be protected from causing excessive damage using the systems disclosed herein. For example, instead of the transformer 21 the electrical device may comprise an electric motor, an impedance device such as a reactor or a resistor or a capacitor. In each instance a fault may develop in the device which will cause the generation of excessive heat or excess current flow not detectable by the usual protective devices associated with such apparatus. Using the present invention in the manner described it is possible to reduce to a minimum the damage that may be caused as a result of the occurrence of such a fault.

What is claimed as new is:

1. In an electric power distribution system in which a transformer has a winding with a low voltage terminal connected to ground and a high voltage terminal connected through a circuit interrupting device for energization to a high voltage conductor, said transformer being likely to develop a fault accompanied by insufficient current flow to cause operation of said interrupting device and by generation of heat sufficient to endanger ambient material, means for causing said interrupting device to operate on the occurrence of such a fault comprising:

means providing an arc gap one terminal of which is said high voltage terminal and the other terminal of which is grounded, a source of conductive fluid, a nozzle for directing said conductive fluid to bridge said arc gap and thereby complete a conductive path between said high voltage terminal and ground and cause sufficient current to flow to operate said interrupting device, conduit means placing said nozzle in communication with said source of conductive fluid, a valve between said source of conductive fluid and said nozzle, and means responsive to predetermined temperature of said transformer for opening said valve to release said conductive field.

2. The electric power distribution system according to claim 1 wherein:

a metallic case encloses said transformer, and said temperature responsive means comprises a heat sensor on said case responsive to its temperature.

3. The electric power distribution system according to claim 2 wherein:

said conductive fluid is stored under pressure in a container mounted on said case, an insulating bushing supports said high voltage terminal on a grounded part of said transformer, and said nozzle opens into said case to spray said conductive fluid across said insulating bushing.

4. The electric power distribution system according to claim 3 wherein said container has a dip tube therein connected at one end to said valve with the other end opening near the bottom of said container, and the top of said container has a filling of gas under pressure.

5. The electric power distribution system according to claim 3 wherein a bladder in said container in communication with said valve has said conductive fluid therein, and said container has a filling of gas under pressure around said bladder.

6. The electric power distribution system according to claim 2 wherein said valve includes a frangible member arranged to be ruptured by said heat sensor.

7. The electric power distribution system according to claim 2 wherein said valve includes tilt valve means arranged to be shifted to open position by said heat sensor.

8. The electric power distribution system according to claim 7 wherein an overcenter release mechanism is interposed between said tilt valve means and said heat sensor.

9. The electric power distribution system according to claim 2 wherein said heat sensor includes
a valve operator, and
a charge of expansible material reacting against said valve operator characterized by having a relatively low coefficient of expansion until it is subjected to a predetermined temperature whereupon said coefficient of expansion is abruptly increased to cause said valve operator to open said valve.

10. The electric power distribution system according to claim 2 wherein said nozzle is formed of conductive material and forms said other terminal of said arc gap.

11. The electric power distribution system according to claim 1 wherein
said high voltage terminal is mounted on a grounded part of said transformer by an insulating bushing, and
said nozzle is mounted to direct said conductive fluid onto said insulating bushing to complete a circuit to ground and cause operation of said interrupting device.

12. In a polyphase electric power distribution system in which a transformer has a winding for each phase, each winding having a low voltage terminal connected to ground and a high voltage terminal connected through a circuit interrupting device for energization to a respective high voltage conductor, said transformer being likely to develop a fault in one or more of its windings accompanied by insufficient current flow to cause operation of the respective interrupting device and by generation of heat sufficient to endanger ambient material, means for causing each of said interrupting devices to operate on the occurrence of such a fault comprising
means providing an arc gap for each winding one terminal of each of which is the respective high voltage terminal and the other terminal of each of which is grounded,
a source of conductive fluid,
one or more nozzles for directing said conductive fluid to bridge the respective arc gap to complete a conductive path between each high voltage terminal and ground and cause sufficient current to flow to cause the respective interrupting device to operate,
conduit means placing each nozzle in communication with said source of conductive fluid,
a valve between said source of conductive fluid and each nozzle, and
means responsive to predetermined temperature of said transformer for opening said valve to release said conductive fluid.

13. The polyphase electric power distribution system according to claim 12 wherein
a metallic case encloses said transformer, and
said temperature responsive means comprises a heat sensor on said case responsive to its temperature.

14. The polyphase electric power distribution system according to claim 12 wherein
said conductive fluid is stored under pressure in a container mounted on said case,
an insulating bushing supports each high voltage terminal on a grounded part of said transformer, and
each nozzle opens into said case to spray said conductive fluid across said insulating bushings.

15. The polyphase electric power distribution system according to claim 12 wherein
each high voltage terminal is mounted on a grounded part of said transformer by an insulating bushing, and
each nozzle is mounted to direct said conductive fluid onto said insulating bushings to complete circuits to ground and cause operation of said circuit interrupting devices.

16. In an electric power distribution system in which an electrical device has a low voltage terminal connected to ground and a high voltage terminal connected through an over current operated circuit interrupter for energization to a high voltage conductor, said electric device being likely to develop a fault insufficient to cause operation of said circuit interrupter, means for causing said circuit interrupter to operate and open the energizing circiut to said electrical device on the occurrence of such a fault comprising
means providing an arc gap one terminal of which is energized when said circuit interrupter is closed and the other terminal of which is grounded,
a source of conductive fluid,
a nozzle for directing said conductive fluid to bridge said arc gap and thereby complete a conductive path between said high voltage terminal and ground and cause sufficient current to flow to operate said circuit interrupter,
conduit means placing said nozzle in communication with said source of conductive fluid,
a valve between said source of conductive fluid and said nozzle, and
means responsive to a fault in said electrical device for opening said valve to release said conductive fluid.

17. The electrical power distribution system according to claim 16 wherein
an insulator supports said one terminal from ground, and
said nozzle is mounted to direct said conductive fluid onto said insulator to complete a circuit to ground and cause operation of said circuit interrupter.

18. The electrical power distribution system according to claim 16 wherein
an electromagnetic operator is connected to said valve, and
means responsive to current flow to said electrical device on the occurrence of said fault for energizing said electromagnetic operator to open said valve.

References Cited

UNITED STATES PATENTS

| | | | |
|---|---|---|---|
| 2,553,291 | 5/1951 | Barr | 317—15 X |
| 3,168,681 | 2/1965 | Wilson | 317—16 X |
| 3,179,851 | 4/1965 | Smith | 317—16 X |
| 3,353,066 | 11/1967 | De Souza | 317—16 X |
| 3,445,726 | 5/1969 | Allen | 317—14 |

JAMES D. TRAMMELL, Primary Examiner

U.S. Cl. X.R.

317—16, 40